United States Patent [19]

Bhagavatula et al.

[11] Patent Number: 4,549,781
[45] Date of Patent: Oct. 29, 1985

[54] POLARIZATION-RETAINING SINGLE-MODE OPTICAL WAVEGUIDE

[75] Inventors: Venkata A. Bhagavatula; Daniel A. Nolan, both of Corning, N.Y.

[73] Assignee: Corning Glass Works, Corning, N.Y.

[21] Appl. No.: 499,898

[22] Filed: Jun. 1, 1983

[51] Int. Cl.$^4$ .............................................. G02B 5/172
[52] U.S. Cl. ................. 350/96.30; 350/96.33
[58] Field of Search ............... 350/96.29, 96.30, 96.31, 350/96.33

[56] References Cited

U.S. PATENT DOCUMENTS

| | | | |
|---|---|---|---|
| 4,077,699 | 3/1978 | Dyott et al. | 350/96.34 |
| 4,179,189 | 12/1979 | Kaminow et al. | 350/96.33 |
| 4,184,859 | 1/1980 | Ramaswamy et al. | 65/2 |
| 4,274,854 | 6/1981 | Pleibel et al. | 65/2 |
| 4,285,730 | 8/1981 | Sanford et al. | 106/47 R |
| 4,354,736 | 10/1982 | Maklad et al. | 350/96.32 |
| 4,360,371 | 11/1982 | Blankenship et al. | 65/3.12 |
| 4,362,819 | 12/1982 | Olszewski et al. | 501/44 |
| 4,465,336 | 8/1984 | Huber et al. | 350/96.30 |

OTHER PUBLICATIONS

V. Ramaswamy et al., Electronics Letters, vol. 14, No. 5, pp. 143-144, 1978.
H. Matsumura et al., 6th Euro. Conf. on Optical Communication, U. of York, U.K., Sep. 1980, pp. 49-52.
T. Okoshi et al., Electronics Letters, vol. 16, No. 18, pp. 712-713, 1980.
Born et al., *Principles of Optics*, Pergamon Press, New York (1975), pp. 705-708.

*Primary Examiner*—William L. Sikes
*Assistant Examiner*—Akm E. Ullah
*Attorney, Agent, or Firm*—W. J. Simmons, Jr.

[57] ABSTRACT

Disclosed is an optical fiber for operating single polarization, single-mode at wavelength $\lambda$. The fiber core is surrounded by cladding having the refractive index lower than the average refractive index of the core. The core is characterized in that it comprises a plurality of transparent laminae, each having a refractive index different from that of the adjacent laminae. The thickness of each laminae is equal to or less than wavelength $\lambda$.

4 Claims, 13 Drawing Figures

POLARIZATION-RETAINING SINGLE-MODE OPTICAL WAVEGUIDE

BACKGROUND OF THE INVENTION

In many applications of single-mode optical waveguides, such as sensors and coherent optical communication systems, it is important that the propagating optical signal retain the polarization characteristics of the input light in the presence of external or internal depolarizing perturbations. The change of the polarization state of a propagating signal can be prevented or reduced by employing a fiber that is birefringent, i.e. the core refractive index is different for two orthogonally polarized light waves.

The polarization performance of a single-mode fiber can be characterized by its beat length L, where L is defined as $2\pi/\Delta\beta$, and $\Delta\beta$ is the difference in the propagation constants of the two orthogonal polarizations. It is desirable to make fibers with a beat length L of 1 mm or less.

Optical fibers in which a slight improvement in polarization performance is achieved by distorting the core symmetry are disclosed in U.S. Pat. No. 4,184,859 and in the publication by V. Ramaswamy et al., "Influence of Noncircular Core on the Polarization Performance of Single Mode Fibers", Electronics Letters, Vol. 14, No. 5, pp. 143-144, 1978. However, the Ramaswamy publication reports that measurements on borosilicate fibers with noncircular cores indicate that the noncircular geometry and the associated stress-induced birefringence decrease L to about 5.5 cm and hence are not sufficient to improve polarization performance in single-mode fibers to the extent necessary to achieve polarization stabilized, single-mode propagation.

The inventions disclosed in U.S. Pat. Nos. 4,179,189 and 4,274,854 are based upon the recognition that orthogonally polarized waves are more efficiently decoupled in a waveguide that is fabricated in such a manner as to deliberately enhance stress-induced, or strain birefringence. Those patents teach that such behavior is accomplished by introducing a geometrical and material asymmetry in the preform from which the optical fiber is drawn. The strain-induced birefringence is introduced by at least partially surrounding the single-mode waveguide by an outer jacket having a different thermal coefficient of expansion (TCE) than that of the waveguide and a thickness along one direction that is different from its thickness along a direction orthogonal to the one direction. Other fibers having stress-induced birefringence are taught in U.S. Pat. Nos. 4,354,736 and 4,360,371.

The publication, H. Matsumura et al., "Fundamental Study of Single Polarization Fibers", Proc. Sixth European Conference on Optical Communication, University of York, U.K., September 1980, pp 49-52, describes a fiber of the type disclosed in the aforementioned U.S. Pat. No. 4,360,371. Such a fiber exhibits a low beat length L because of both an anisotropic stress and a non-circular core. A minimum beat length of 0.77 mm is reported for a fiber having a core of silica doped with 27 mole % $GeO_2$, the core exhibiting an elipticity of greater than 80%. However, such a fiber would possess an attenuation of approximately 20 dB/km or more, thus making it unsuitable for use as a long distance transmission line. This publication reports that a $B_2O_3$-doped single polarization fiber suitable for use as a long distance transmission line exhibited a coupling length L of 1.5 mm.

A single-mode fiber having an azimuthally asymmetric refractive index profile to increase the difference between the propagation constants of the two orthogonal polarizations of the single mode signal is taught in the publication, T. Okoshi et al., "Single-Polarization Single-Mode Optical Fibre with Refractive-Index Pits on Both Sides of Core", Electronics Letters, Vol. 16, No. 18, Aug. 28, 1980, pp 712-713. This publication describes a fiber having a circular central region which is divided into a central, rectangularly-shaped core and circular segments of low index along the long sides of the central region. That fiber is reported to have a beat length of 2.3 mm.

The stabilization of the polarization state in an optical waveguide has also been accomplished by employing an optically anisotropic single crystal as the light conducting medium. For example, see U.S. Pat. No. 4,077,699 (Dyott et al.). That the birefringent properties of crystals may be explained in terms of the anisotropic electrical properties of the molecules of which the crystals are composed is pointed out in the text: Born et al. *Principles of Optics*, Pergamon Press, New York (1975) pp 705-708. It is further stated that "form birefringence" may also arise on a scale that is larger than molecular when there is an ordered arrangement of similar particles of optically isotropic material whose size is larger compared with the dimensions of molecules but small compared with the wavelength of light. Such a medium may be visualized as an assembly of thin parallel plates of thickness $t_1$, dielectric constant $\epsilon_1$ and refractive index $n_1$ immersed in a medium having a dielectric constant $\epsilon_2$ and refractive index $n_2$. The widths of the spaces between the plates is $t_2$. After deriving the difference between dielectric constants parallel to the plates and normal to the plates, Born et al. conclude that the composite assembly behaves like a negative uniaxial crystal. The difference between the refractive indices n and n parallel to and normal to the plane of the plates, respectively, is given as $$n_{\|}^2 - n_{\perp}^2 = \frac{f_1 f_2 (n_1^2 - n_2^2)^2}{f_1 n_2^2 + f_2 n_1^2} \tag{1}$$

where $f_1 = t_1/(t_1 + t_2)$ and $f_2 = 1 - f_1$.

The aforementioned Dyott et al. patent indiates that an optical waveguide fiber having a crystalline core and glass cladding is subject to such defects as voids lying between the crystal and the glass. Also, since the cylindrical core must be formed as a single crystal, the formation of long lengths of such fiber is very difficult, 200 mm lengths of defect-free crystal being mentioned in said Dyott et al. patent.

SUMMARY OF THE INVENTION

It is therefore an object of the present invention to provide an improved polarization stabilized or single polarization single-mode optical waveguide fiber.

Briefly, the present invention pertains to an optical fiber capable of operating single polarization, single-mode at a wavelength λ. The fiber includes a core member surrounded by a cladding member having an average refractive index lower than the average refractive index of the core member. The fiber is characterized in that one or both of the core and cladding members comprises a plurality of transparent laminae. Each of

DESCRIPTION OF THE PREFERRED EMBODIMENTS

The present invention relates to an optical fiber in which form birefringence exists due to the fact that either the core or the cladding or both are constructed of substantially parallel, longitudinally extending laminae of transparent material, adjacent ones of which exhibit different refractive index. In addition, the fiber may contain birefringence caused by one or more of such other factors as a stress, refractive index pits adjacent the core, and the like.

Figure 1:
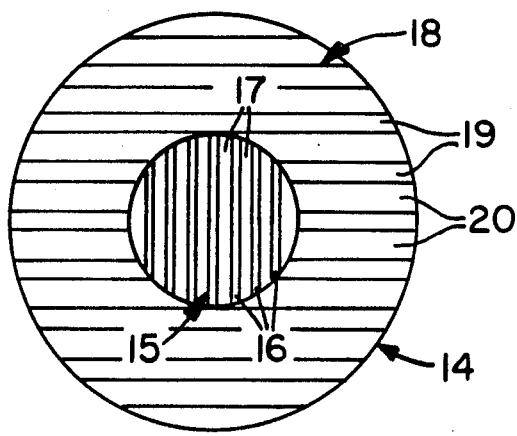
FIG. 1 is a cross-sectional view of an embodiment of the invention wherein both core and cladding are laminated.

Referring to FIG. 1 there is shown a fiber 14 comprising a core 15 of transparent material surrounded by a transparent cladding 18. Core 15 may be formed of a plurality of transparent laminae 17, adjacent ones of which are separated by transparent laminae 16. In an embodiment which is preferred from the standpoint of ease of manufacturing, the core comprises the aforementioned laminated structure, and the cladding is either a homogeneous layer, or it consists of a plurality of concentric layers.

From the standpoint of performance, i.e., the ability to maintain the plane of polarization of an input signal, in addition to the laminated core 15, the cladding 18 should also be laminated. In FIG. 1 the cladding comprises transparent laminae 20 separated by transparent laminae 19 of different refractive index than laminae 20. Cladding laminae 19 and 20 are perpendicular to core laminae 16 and 17. The birefringent properties of the core member 15 and the cladding member 18 can be characterized in terms of equation (1), and therefore, the thickness of any of the lamina 16, 17, 19 or 20 must be approximately equal to or less than the wavelength λ of the light to be propagated through the fiber. It is thought that a fiber would be effective for the purpose of maintaining the polarization of a propagated signal even if the laminae thicknesses were slightly greater than λ, although its performance would not be as effective as it would be if the thickness was equal to or less than λ.

Figure 2:
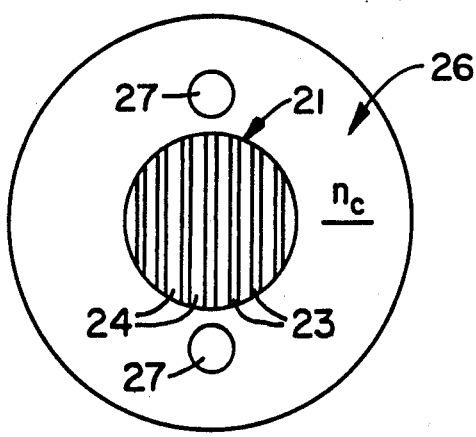
FIG. 2 is a cross-sectional view of a fiber wherein only the core is laminated and the cladding contains stress rods.

FIG. 2 illustrates an embodiment wherein the core 21 is a laminated structure comprising a plurality of alternately disposed laminae 23, 24 that extend parallel to the fiber axis. The refractive index of laminae 23 is different from that of laminae 24. Cladding 26 is a homogeneous material having a refractive index $n_c$ that is lower than the average refractive index of laminae 23 and 24. FIG. 2 also illustrates the use of stress rods 27, the birefringent effect of which may add to or subtract from the effect produced by the laminated core. A birefringent effect is also induced by the stress caused by employing alternate laminae which have different TCE.

Figure 3:
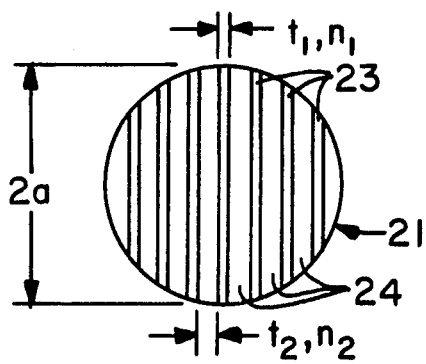
FIG. 3 is an enlarged view of the core of the fiber of FIG. 2.

FIG. 3 is an enlarged view of core 21, the diameter of which is $2a$. The thickness of laminae 23 is shown to be $t_1$, the refractive index thereof being $n_1$. The thickness of laminae 24 is shown to be $t_2$, the refractive index thereof being $n_2$. The refractive index of the cladding material surrounding the core is $n_c$, as shown in FIG. 2.

Figure 4:
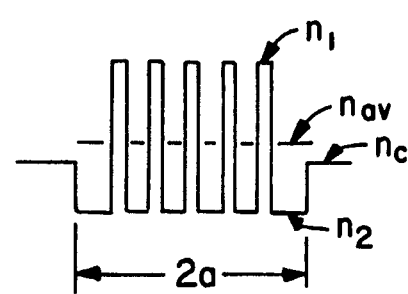
FIGS. 4 and 5 are refractive index profiles taken through the axis of the core of FIG. 3 in directions perpendicular to the laminae and along the laminae, respectively.
Figure 5:
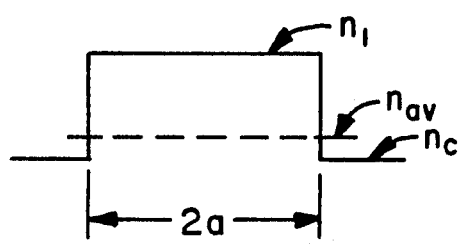

Refractive index profiles taken through the core axis in a direction perpendicular to the laminae and along the laminae are illustrated in FIGS. 4 and 5, respectively. The dashed line marked $n_{av}$, which is the average refractive index of the core due to the contributions of laminae 23 and 24, is somewhat higher than the cladding refractive index $n_c$.

Figure 6:
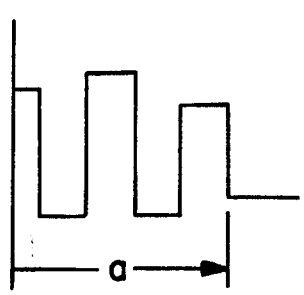
FIGS. 6 and 7 are illustrative of various alternative profiles which may be employed in place of those of FIGS. 4 and 5.
Figure 7:
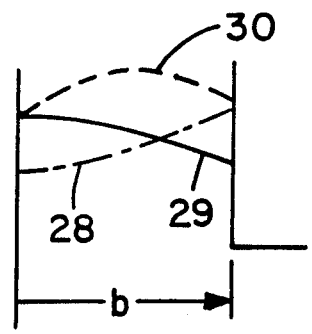

FIGS. 6 and 7 are intended to be illustrative of various profiles which satisfy the requirements of the present invention. Whereas all of the lamina 23 are shown by FIG. 4 to have a refractive index $n_1$, these lamina could have different refractive indices as shown in FIG. 6, wherein the core refractive index is plotted as a function of radius. Also, as shown in FIG. 7, the refractive index within a lamina can be any non-step profile including any α-type profile or other gradation. FIG. 7 also shows that the refractive index within a lamina can increase as a function of distance from the center of the lamina as shown by curve 28, or it can decrease or follow some other function of distance as indicated by curves 29 and 30.

Figure 8:
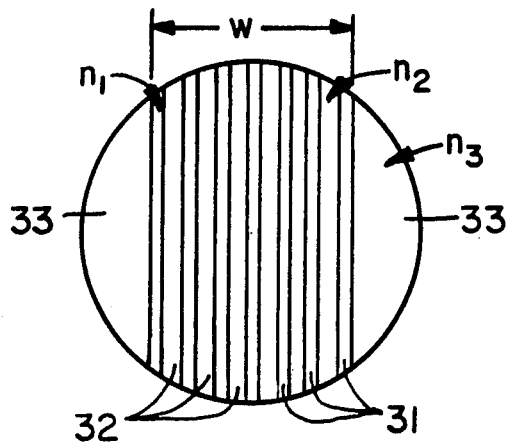
FIGS. 8 and 9 illustrate the cross-sectional configurations of two types of rectangular cross.
Figure 9:
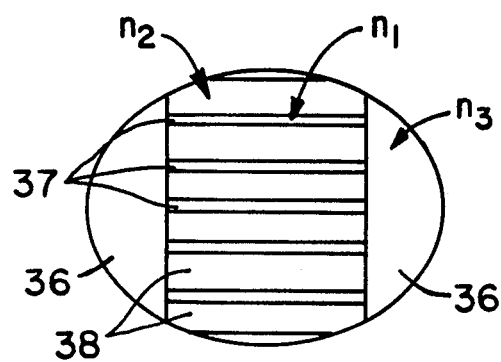

The circularly-shaped core 21 of FIGS. 2 and 3 is a convenient shape for coupling light from certain sources to the fiber. However, other core shapes such as elliptical or rectangular may be employed in the fiber of the present invention. FIGS. 8 and 9 illustrate two rectangular shapes. In FIG. 8, laminae 31 and 32 form a rectangularly-shaped core having regions 33 of transparent material on opposite sides thereof. Regions 33 can be formed of a material having a refractive index $n_3$ which is lower than the cladding refractive index, in which case they are known as refractive index pits. As taught in the aforementioned Okoshi et al. publication, such refractive index pits function to create a birefringence, and such birefringence can add to the effect of the laminated core. Similarly, regions 36 of transparent material are located on opposite sides of the rectangular core illustrated in FIG. 9. In addition, FIG. 9 illustrates that the overall shape of the core and adjacent refractive index pits may be elliptical. Whereas laminae 31 and 32 of FIG. 8 are parallel to the long dimension of the rectangular core, laminae 37 and 38 are perpendicular thereto. Also, regions 33 and 36 of FIGS. 8 and 9 could be omitted, in which case they would be replaced by cladding material. Some of the possible combinations of the refractive indices of various parts of the fiber are listed in Table 1.

TABLE 1

Some Possible Refractive Index Combinations a. $n_1 > n_2 > n_c$
b. $n_1 > n_c > n_2$
c. $n_2 > n_1 > n_c$
d. $n_2 > n_c > n_1$
e. $n_1 > n_2 > n_c > n_3$
f. $n_1 > n_2 > n_3 > n_c$ In accordance with the present invention the various portions of the fiber, including the core laminae, can be formed of any transparent material having the required refractive index, provided that such material can be formed into a fiber. Examples of such transparent material are glass, plastic, crystalline material and combinations thereof. For example, low temperature glasses of the type disclosed in U.S. Pat. Nos. 4,285,730 and 4,362,819 could be laminated with plastic material. Also, one or more of the lamina could be dye-doped and thereby function as an optically active medium suitable for use as a laser or amplifier.

As stated previously, the thicknesses of the laminae which constitute the core and/or the cladding should be approximately equal to or less than the wavelength of light to be propagated through the fiber during operation thereof as a polarization stabilized or single polarization single-mode fiber. The minimum effective thicknesses of the laminae are difusion limited and must therefore be greater than 100 angstroms.

The following theoretical example illustrates the manner in which fibers designed in accordance with the present invention can achieve submillimeter beat lengths. Assume that the fiber is to be operated at a wavelength of 632.8 nm. The core is constructed in accordance with FIG. 8, and the cladding is a homogeneous layer of glass having a refractive index of 1.46. The core diameter is 6.0 μm and w, the smaller dimension of the rectangular core is 3.0 μm. The thicknesses $t_1$ and $t_2$ are assumed to be equal, the maximum permissible value thereof being about 0.63 μm in view of the operating wavelength. Laminae 31 have a refractive index of about 1.5. Laminae 32 have a refractive index of about 1.45. The ratio $t_1/(t_1+t_2)$ is 0.5, and the average refractive index $n_{av}$ is therefore about 1.475. Refractive index pits 33, which have a thickness of 1.5 μm, exhibit a refractive index of about 1.445. The aforementioned refractive index values can be obtained by adding to silica appropriate amounts of one or moe dopants such as $GeO_2$, $P_2O_5$, $Al_2O_3$, $B_2O_3$ and F. Other optical quality glasses which could provide the necessary refractive indices are also known.

Figure 11:
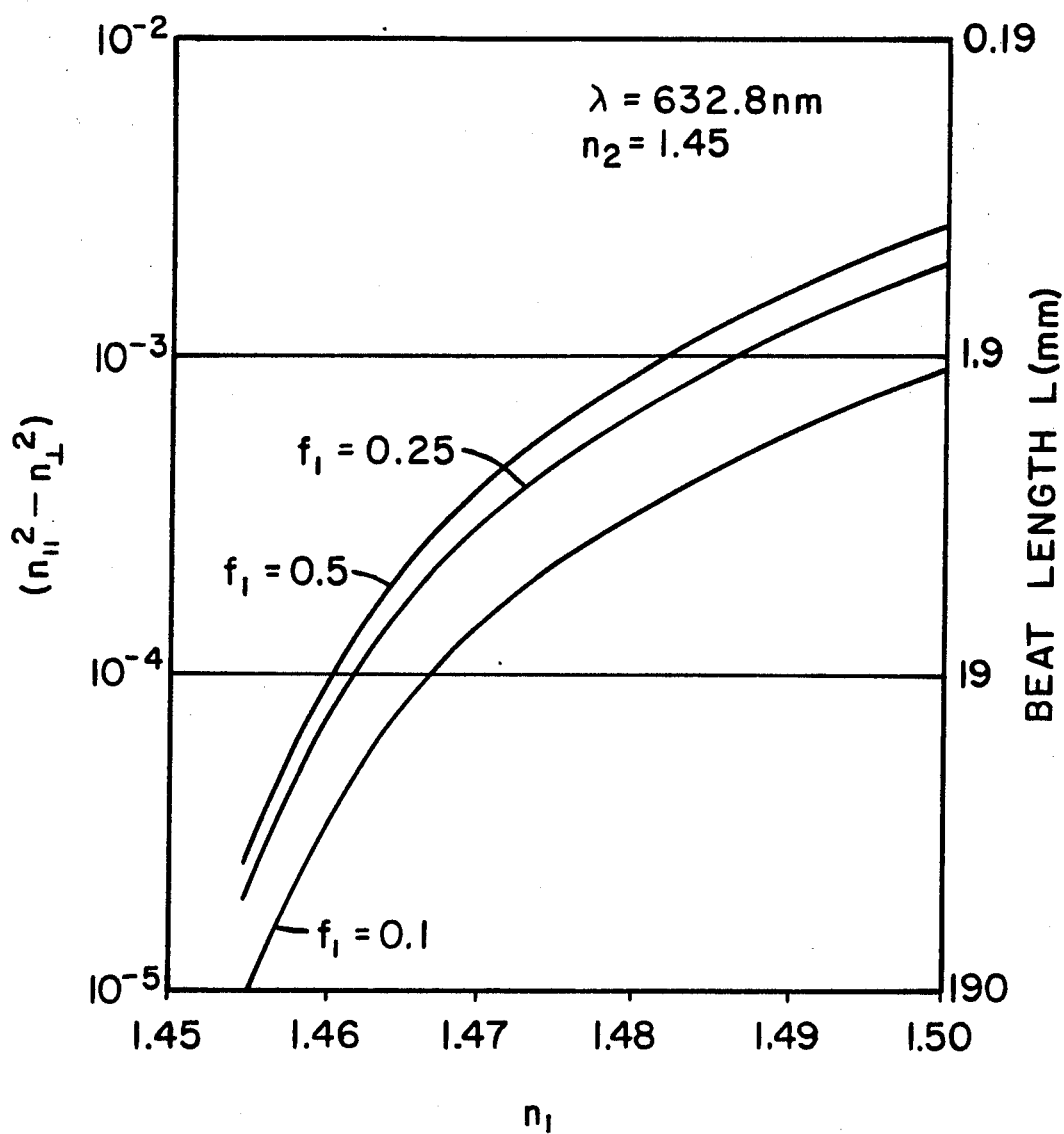
FIG. 11 is a graph wherein both the quantity $(n_{\parallel}^2 - n_{\perp}^2)$ and beat length L are plotted as a function of $n_1$ for a specific value of $n_2$.

If the operating V-value is assumed to be 3, the following birefringence characteristics of the fiber can be estimated, assuming that the two types of birefringence that are considered are additive. It is noted that the cutoff V-value would be about 4 in order to obtain single-mode operation. The quantity $(n_{\parallel}^2 - n_{\perp}^2)$ is plotted in FIG. 11 as a function of the refractive index $n_1$ for fibers in which the valve of $n_2$ is 1.45. Three different curves are plotted for the parameter $f_1 = 0.1$, 0.25 and 0.5. The beat length L of the fiber operated at 632.8 nm is the ordinate expressed along the right side of the graph. The uppermost curve indicates that at $f_1$ equal to 0.5 and $n_1$ equal to 1.55, the beat length is about 0.8 mm. It is noted that the quantity $(n_{\parallel}^2 - n_{\perp}^2)$ is about $2.5 \times 10^{-3}$ for this value of beat length.

The waveguide effect caused by the generally rectangular core having low index pits on opposite sides there of (see the above-identified Okoshi et al. publication) results in a beat length of about 2.3 mm. If the form birefringence and that due to the refractive index pits are additive, the fiber beat length at 632.8 nm will be about 0.5 mm. It is noted that stress birefringence effects are not considered in this example. The addition of stress rods such as those illustrated in FIG. 3 could result in an even lower beat length.

Fibers of the type illustrated in FIG. 1 could be fabricated by forming a preform of slabs of glass having the appropriate refractive index. The widths and thicknesses of the glass slabs would be proportional to the widths and thicknesses of the lamina in the resultant fiber. The preform so formed could be heated at one end and drawn into a fiber.

To form a fiber wherein only the core is laminated, slabs of glass having the appropriate refractive index can be stacked as indicated above and then drawn into an intermediate fiber having an average diameter in the range of about 4 to 10 mm. This drawing operation will cause adjacent slabs to adhere to one another. The outer surface of the resultant intermediate fiber can be ground and polished to the desired cross-sectional configuration such as circular. It can then be provided with a layer of cladding glass by inserting it into a tube or by rotating it in a lathe while directing thereon a stream of glass soot as taught in U.S. Pat. No. 4,360,371.

Figure 10:
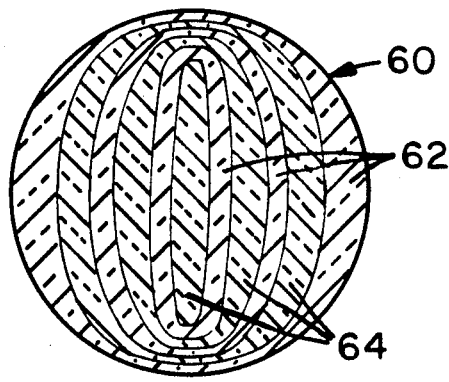
FIG. 10 is a cross-sectional view of a fiber core having cured laminations.

Another method of fabrication is disclosed in U.S. patent application Ser. No. 500,004 entitled now U.S. Pat. No. 4,528,009 "Method of Forming Optical Fiber Having Laminated Core" (A. Sarkar) filed on even date herewith. FIG. 10 is a cross-sectional view of the core region of an optical fiber formed by the method of the Sarkar application. It can be seen that the surfaces of laminae 62 and 64 are curved.

Figure 12:
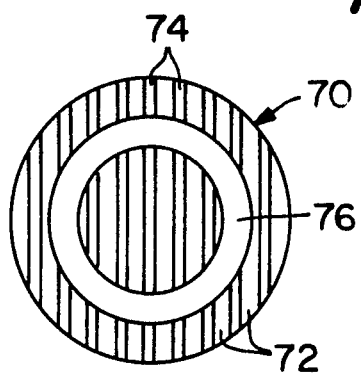
FIG. 12 is a cross-sectional view of a laminated optical fiber core containing an annular refractive index depression.
Figure 13:
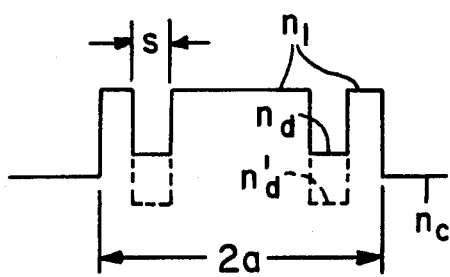
FIG. 13 is a refractive index profile taken along the central lamina of FIG. 12.

The potentially high bandwidth of single-mode optical fibers can be achieved only if the total dispersion for the $HE_{11}$ mode is equal to zero or as near as possible to zero at the operating wavelength. Copending application Ser. No. 496,560 entitled "Low Dispersion, Low-Loss Single-Mode Optical Waveguide" filed on May 20, 1983 teaches a fiber design which results in dispersion minimization over a wide wavelength range. The technique employed in said copending application can be utilized in combination with the laminated core design described hereinabove to achieve low dispersion, polarization stabilized, single-mode propagation. The core of such a fiber is illustrated in FIG. 12. Circular core 70 is formed of laminae 72, adjacent ones of which are separated by laminae 74 of different refractive index. One or more regions of depressed refractive index may exist witin the core, as taught in said copending application, to reduce dispersion or to provide low dispersion operation over a wide band of wavelengths. In FIG. 12 the depressed refractive index region is in the form of an azimuthally symmetric ring 76. As shown in FIG. 13, which is the refractive index profile of centrally located lamina 74, the refractive index $n_1$ of lamina 74 may decrease to a value of $n_d$ in region 76. The dashed line in FIG. 13 is illustrative of the fact that the refractive index $n_d'$ of region 76 can be lower than the cladding refractive index $n_c$. Whereas the index depression is shown in FIG. 13 as being flat, it can be any shape such as rounded or V-shaped. Region 76 could also be azimuthally assymmetric. Furthermore, there may be more than one region of depressed refractive index. An index depression may be superimposed on any type of lamina index profile. For example, any of the profiles 28, 29 or 30 of FIG. 7 could have superimposed thereon one or more index depressions of the type described above. Whereas the thicknesses of the core laminae must be no greater than approximately the wavelength $\lambda$ to be propagated through the fiber, the width s of the index depression must be greater than $\lambda$.

We claim:

1. An optical fiber capable of operating polarization stabilized or single polarization, single-mode at a wavelength $\lambda$, said fiber having a core member surrounded by a cladding member having an average refractive index lower than the average refractive index of said core member, said fiber being characterized in that at least said core member comprises a plurality of transparent glass laminae, each of said laminae having a refractive index different from that of the adjacent laminae, the thickness of each of said laminae being approximately equal to or less than the wavelength $\lambda$, the refractive index of one type of said core laminae being less than the average refractive index of said cladding.

2. An optical fiber capable of operating polarization stabilized or single polarizaion, single-mode at a wavelength $\lambda$, said fiber having a core member surrounded by a cladding member having an average refractive index lower than the average refractive index of said core member, said fiber being characterized in that at least said core member comprises a plurality of transparent glass laminae, each of said laminae having a refractive index different from that of the adjacent laminae, the thickness of each of said laminae being approximately equal to or less than the wavelength $\lambda$, at least those laminae which are located in the central region of the core and which have a refractive index greater than that of the laminae adjacent thereto, have at least two off axis regions of depressed refractive index, the widths of said depressed refractive index regions being greater than $\lambda$.

3. An optical fiber capable of operating polarization stabilized or single polarization, single-mode at a wavelength $\lambda$, said fiber having a core member surrounded by a cladding member having an average refractive index lower than the average refractive index of said core member, said fiber being characterized in that at least said core member comprises a plurality of transparent glass laminae, each of said laminae having a refractive index different from that of the adjacent laminae, the thickness of each of said laminae being approximately equal to or less than the wavelength $\lambda$, the refractive index profile along at least one of said laminae in a plane perpendicular to the longitudinal axis of said fiber being nonuniform.

4. An optical fiber cable of operating polarization stabilized or single polarization, single-mode at a wavelength $\lambda$, said fiber having a core member surrounded by a cladding member having an average refractive index lower than the average refractive index of said core member, said fiber being characterized in that at least said core member comprises a plurality of transparent glass laminae, each of said laminae having a refractive index different from that of the adjacent laminae, the thickness of each of said laminae being approximately equal to or less than the wavelength $\lambda$, the refractive indices of alternate ones of said laminae in a plane perpendicular to the longitudinal axis of said fiber being different.

* * * * *